United States Patent
Cueman et al.

(10) Patent No.: US 6,883,322 B2
(45) Date of Patent: Apr. 26, 2005

(54) SYSTEM AND METHOD FOR TURBOCHARGER CONTROL

(75) Inventors: Michael Kent Cueman, Niskayuna, NY (US); Nirm Velumylum Nirmalan, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 10/463,374

(22) Filed: Jun. 16, 2003

(65) Prior Publication Data

US 2004/0250539 A1 Dec. 16, 2004

(51) Int. Cl.⁷ .............................................. F02B 33/44
(52) U.S. Cl. .......................... 60/606; 60/611; 60/602; 60/289
(58) Field of Search ........................... 60/606, 611, 602, 60/280, 289

(56) References Cited

U.S. PATENT DOCUMENTS

| | | | | |
|---|---|---|---|---|
| 3,849,988 A | * | 11/1974 | Melchior ..................... | 60/606 |
| 4,259,840 A | * | 4/1981 | Tenney ........................ | 60/602 |
| 4,373,336 A | * | 2/1983 | Horler et al. ................. | 60/606 |
| 4,674,283 A | * | 6/1987 | Ishida et al. .................. | 60/606 |
| 4,833,886 A | * | 5/1989 | Meier .......................... | 60/606 |
| 5,406,796 A | * | 4/1995 | Hiereth et al. ................ | 60/606 |
| 5,724,813 A | * | 3/1998 | Fenelon et al. ............... | 60/606 |
| 6,415,606 B1 | | 7/2002 | Bowman et al. .............. | 60/602 |
| 6,470,864 B2 | * | 10/2002 | Kim et al. .................... | 60/606 |

FOREIGN PATENT DOCUMENTS

| | | | | |
|---|---|---|---|---|
| FR | 2226559 A | * | 12/1974 | .......... F02B/37/08 |
| JP | 57200618 A | * | 12/1982 | .................. 60/606 |

* cited by examiner

*Primary Examiner*—Thai-Ba Trieu
(74) *Attorney, Agent, or Firm*—Paul J. DiConza; Patrick K. Patnode

(57) ABSTRACT

A system and method are provided to control a turbocharger by fluidic control of engine exhaust by steering the same. The system and method include fluidic control of engine exhaust flow directed toward an expander section of the turbocharger, wherein one of position or velocity is effectively varied by a small stream of a fluid in fluid communication with the exhaust gas flow thereby varying the drive of a compressor section of the turbocharger.

22 Claims, 2 Drawing Sheets

SYSTEM AND METHOD FOR TURBOCHARGER CONTROL

BACKGROUND OF THE INVENTION

The invention relates generally to turbochargers, and more specifically, to control of turbochargers.

Conventionally, turbochargers are operably connected to an internal combustion engine in which exhaust gas from the engine is utilized to increase the pressure of intake air above ambient to the engine. Typically, the turbocharger includes a shaft, a driving turbine or expander attached at one end of shaft, and a compressor attached to the other end of the shaft. The expander is attached to the engine to receive exhaust gases from the engine and the compressor is attached to an air intake manifold of the engine.

During operation, the expander receives exhaust gas which causes the shaft to rotate, which in turn, causes the compressor to rotate and supply air to the air intake manifold of the engine at an increased pressure, i.e., at a pressure greater than ambient air pressure.

The turbochargers used to boost the power of both gasoline and diesel engines are typically uncontrolled (open loop) devices that impose performance constraints on both the turbocharger and the engine it boosts.

Some turbocharger control systems have incorporated mechanical waste gates and moveable guide vanes which physically reduce the driving energy of the exhaust on the turbine in some operating conditions. However, these devices have durability problems associated with their use because of the hostile environment in which they must operate (e.g., heat and vibration). For example, they may require lubrication, bearings and/or seals subject to failure in this hostile environment.

More recently, incorporation of a separate electric motor/alternator connected to the shaft to modulate and increase the rotational speed of the shaft in a continuous manner relative to and in response to the speed of the engine, to increase the rotational speed of the shaft to overcome "turbo lag" (i.e., the short period of time after increased power demand is first sensed until the rotary compressor driven by the exhaust gas turbine reaches its full power capacity), and also to extract electrical energy from the exhaust gas has been utilized. However, this approach is still technically immature.

Thus, there is still a need for a simple, robust control mechanism for tailoring the turbocharging of a gasoline engine or diesel engine, of a diesel electric locomotive for example, to increase engine performance and reliability.

BRIEF DESCRIPTION OF THE INVENTION

The above discussed and other drawbacks and deficiencies of the prior art are overcome or alleviated by a system and method of controlling a turbocharger in an internal combustion engine.

In one aspect of the present invention, a method is disclosed for controlling a turbocharger of an engine. The method includes steering engine exhaust that is normally directed in a first direction toward an expander section of the turbocharger and that may be steered in a second direction that varies the ability of the engine exhaust to drive a compressor section of the turbocharger. The steering includes a small stream of fluid in fluid communication with the engine exhaust in the expander section.

In another aspect of the present invention, this is accomplished by providing a system for turbocharging an engine. The system includes a turbocharger for increasing air pressure above ambient air pressure to the engine; and a control system configured for providing a small stream of fluid which is operably configured to steer engine exhaust that is directed in a first direction toward an expander section of the turbocharger in a second direction that varies the ability of the engine exhaust to drive a compressor section of the turbocharger, wherein the small stream of fluid is in fluid communication with the engine exhaust in the expander section.

The foregoing and other aspects will become apparent from the following detailed description of the invention when considered in conjunction with the accompanying drawing figures.

BRIEF DESCRIPTION OF THE DRAWINGS

Referring to the exemplary drawings wherein like elements are numbered alike in the several Figures.

DETAILED DESCRIPTION OF THE INVENTION

The system and method of this invention may be used to advantage in gasoline and diesel fuel engines, and especially locomotive engines, as well as any other reciprocating engine where a turbocharger is used to boost power output from the engine.

In one exemplary embodiment of a turbocharger system, the system and method for controlling a turbocharger of an engine will be described with reference to a diesel engine for a locomotive. However, it will be noted that the system and method for controlling a turbocharger of an engine may be employed in a gasoline as well as a diesel engine, or any reciprocating engine.

Figure 1:
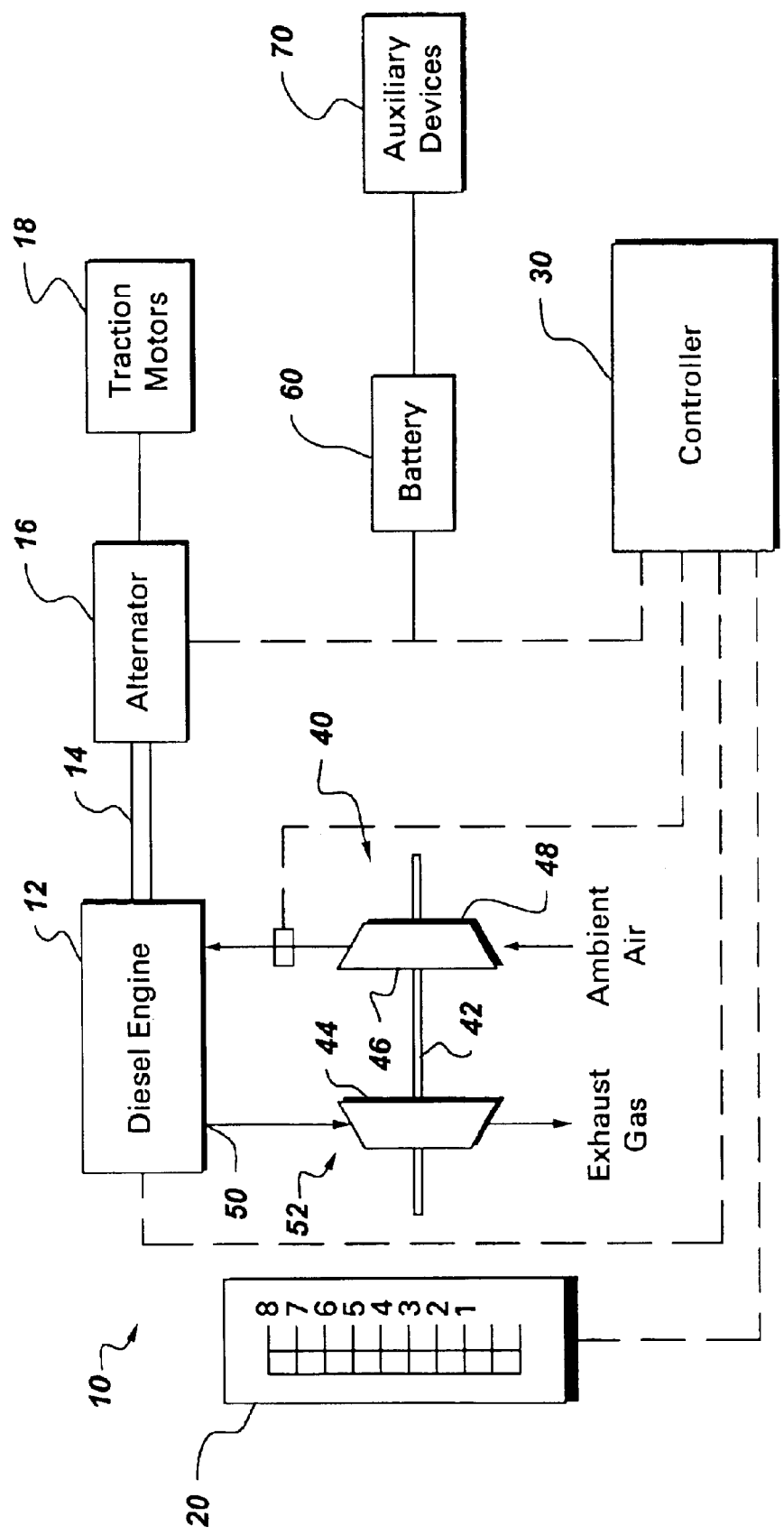
FIG. 1 is a diagrammatic illustration of one embodiment of a power plant system of a diesel electric locomotive incorporating a turbocharger system according to the present invention.

FIG. 1 diagrammatically illustrates a power plant system 10 of a diesel electric locomotive according to one embodiment of the present invention. Power plant system 10 generally includes, for example, a diesel engine 12 having a drive shaft 14 coupled to a generator or alternator 16. Alternator 16 provides electric power to one or more traction motors 18 for propelling the locomotive.

A throttle control 20 operably connects to a controller 30 such as the locomotive's elaborate control system for controlling the operation of diesel engine 12. Throttle control 20 typically includes eight positions or notches plus idle and shutdown. Notch 1 corresponds to a minimum desired engine speed (power), while notch 8 corresponds to maximum speed and full power. In operation, the propulsion system of the diesel electric locomotive is controlled, e.g., by controller 30, to establish a balanced steady state condition wherein the engine driven alternator produces, for each discrete position of a throttle handle, a substantially constant amount of electrical power for the traction motors.

In this embodiment, power plant system 10 also includes a turbocharger system 40 for increasing the air pressure above ambient air pressure to an intake manifold of diesel engine 12. Turbocharger system 40 includes a single rotatable shaft 42 which is attached at one end to a driving turbine or expander 44 and at the other end to a compressor turbine or compressor 46. Expander 44 is operably connected to an exhaust outlet 50 of diesel engine 12 via a turbo inlet shown generally at 52 and compressor 46 is operably connected to an air intake 54 of diesel engine 12 (See FIG. 2). Turbo inlet 52 is configured to operably direct engine exhaust toward expander 44 to drive compressor 46 via shaft 42. Alternator 16 is also operably connected to a battery 60 for suppling electrical energy to energize battery 60 for storing electrical energy generated by alternator 16 for driving auxiliary devices 70 operably connected thereto.

Figure 2:
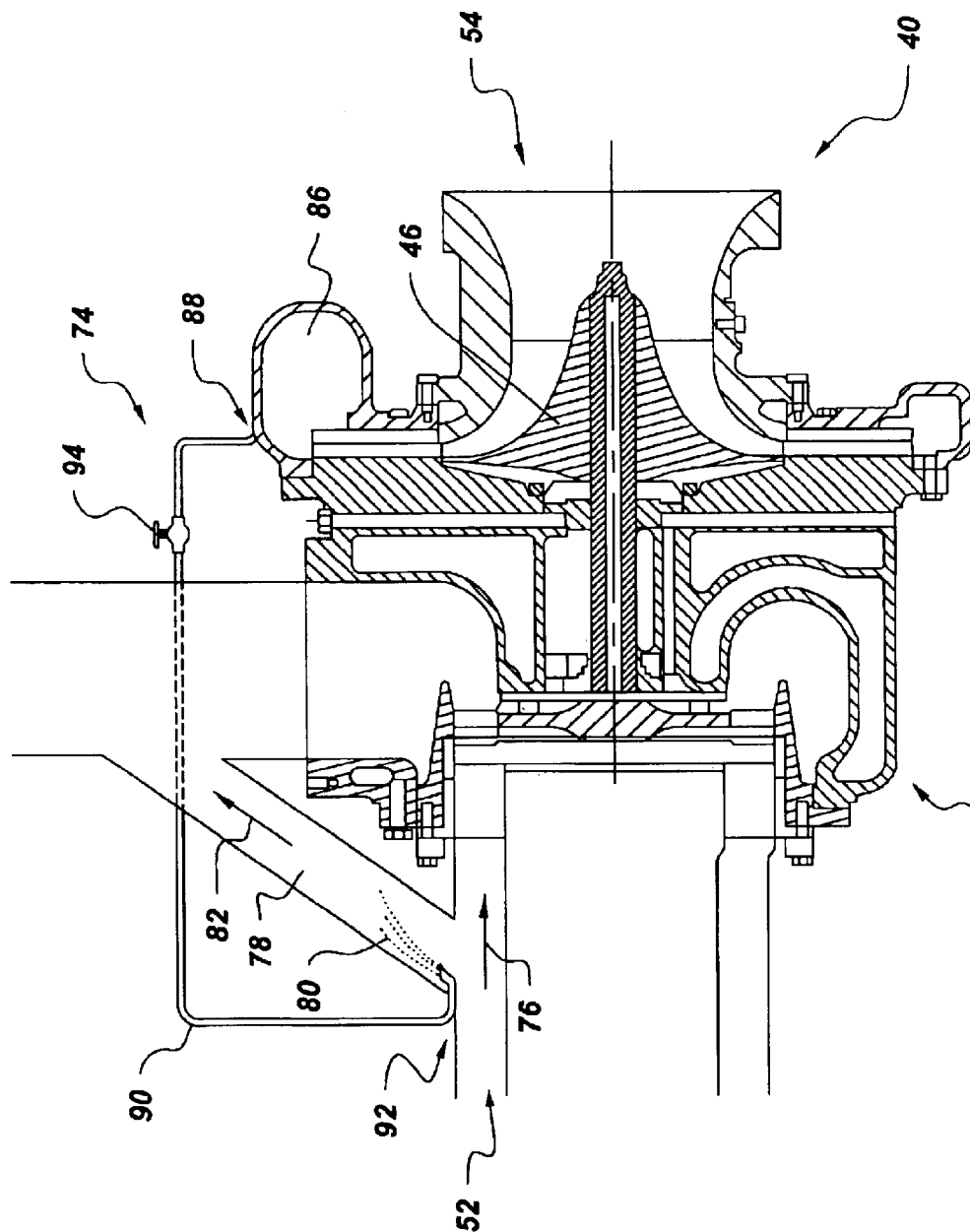
FIG. 2 is an enlarged cross-sectional view of the turbocharger system of FIG. 1 schematically depicting an exemplary embodiment of a control system in communication with the turbocharger system.

Referring now to FIG. 2, a description of turbocharger system 40 will be had in more detail. FIG. 2 illustrates a cross sectional view of a turbocharger 40 depicted in turbocharger system 40 of FIG. 1 incorporating a schematic showing an exemplary embodiment of a system and method for controlling the turbocharger generally at 74.

In an exemplary embodiment, control system 74 includes a small stream of fluid depicted generally at 80 in fluid communication with engine exhaust entering expander 44 via turbo inlet 52. The small stream of fluid is configured to provide fluidic control of the larger stream of engine exhaust that is initially fully directed toward expander 44 in a first direction depicted with arrow 76. The small stream of fluid allows a portion of engine exhaust from turbo inlet 52 to be redirected into a bypass chamber 78 in a second direction depicted with arrow 82. In this manner, the engine exhaust is steered in directions 76, 82 which vary the engine exhaust ability to drive compressor 46 of turbocharger 40. By varying the pressure of the small stream of fluid 80, the turbocharger may be modulated to provide fine control of the intake manifold air pressure in the engine. It will also be noted that although the small stream of fluid is directed into bypass chamber 78, the small stream of fluid 80 may also be operably disposed in turbo inlet 52. Further, it should be noted that bypass chamber 82 in fluid communication with turbo inlet 52 may optionally be absent.

In one embodiment, the small stream of fluid is air that is preferably variably compressed. In the embodiment depicted in FIG. 2, the compressed air may feed from a compressor manifold 86 of turbocharger 40 generally shown at 88 that is in fluid communication with chamber 78 via tubing 90 to a jet 92 disposed within chamber 78. However, as it will be appreciated by one skilled in the pertinent art, other sources of in situ compressed air are contemplated including, but not limited to, compressed air for a vehicle or locomotive braking system.

In an exemplary embodiment, control system preferably includes a controller 94 configured to modulate the small stream of fluid 80 to chamber 78 thus modulating air from compressor 46. Controller 94 may be a mechanical or electrical control valve that is optionally in operable communication with controller 30. Controller 94 is preferably remote from the small stream of fluid 80 and engine exhaust in turbocharger 40 in order to avoid operation in such a hostile environment.

Turbocharger 40 benefits from both low and high engine power operation. For example, the locomotive in the low power region of operation, e.g., notches 1, 2 and 3, controller 30 controls the supply of compressed air in fluid communication with engine exhaust entering turbo inlet 52 directed toward expander 44 to rotate or spin compressor 48 faster than compressor 48 would normally be spun due to the low volume of exhaust gas from diesel engine 12 to expander 44 to provide a generally constant increased level of air pressure above ambient air pressure to diesel engine 12. For each notch position in the lower power regions of operation, the supply of compressed air is desirably increased or reduced in discrete constant modes, e.g., resulting in a constant speed and/or constant increased air pressure level above ambient air pressure for each of the notch levels because. In one embodiment, increasing the pressure or velocity of the small stream of fluid 80 results in an increase in the intake air pressure and mass flow rate to diesel engine 12 thereby reducing emissions such as smoke, unburned hydrocarbons, and carbon monoxide, and improving fuel economy, and increasing engine power output. In this manner, the increase pressure or velocity of compressed air acting on engine exhaust directs the engine exhaust to expander 44 to optimize a resulting driving force of compressor 46.

It should also be pointed out that the small stream of fluid 80 may be operably positioned with respect to the larger stream of engine exhaust such that increased pressure or velocity of the small stream of fluid 80 either increases or decreases driving force of the compressor depending on the design parameters of the expander 44 which is driven by at least the engine exhaust. Alternatively, it is contemplated that the small stream of fluid 80 along with engine exhaust may drive expander 44 such that the small stream of fluid 80 may aid in lowering the operating temperature of turbo charger 40.

The invention disclosed hereinabove, addresses a number of the major problems which hinder effective modulation of turbochargers. More specifically, fluidic control of a turbocharger enables fine control of the manifold air pressure and thus, power and emissions, in an internal combustion engine. Fluidic control provides for turbocharger control without any moving parts in the hot gas stream thus gaining cost benefit and reliability. Furthermore, fluidic control is optionally powered using excess air provided by the compressor side of the turbocharger providing system design simplicity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What claimed is:

1. A method for controlling a turbocharger of an engine, the method comprising:
   steering engine exhaust that is directed in a first direction toward an expander section of the turbocharger in a second direction that varies the ability of said engine exhaust to drive a compressor section of the turbocharger,
   wherein said steering includes using a small stream of fluid in fluid communication with said engine exhaust in said expander section to provide fluidic control of a larger stream of said engine exhaust, thereby fluidically redirecting a portion of said engine exhaust from said first direction to said second direction.

2. The method of claim 1 wherein said small stream of fluid includes a jet of compressed air in fluid communication with said engine exhaust.

3. The method of claim 1 wherein said small stream of fluid is disposed in a bypass chamber in fluid communication with a turbo inlet, said turbo inlet directing said engine exhaust in said first direction toward said expander section.

4. The method of claim 3 wherein as said stream of fluid increases in one of pressure and velocity, a larger portion of engine exhaust is directed away from said expander section via said bypass chamber.

5. The method of claim 1 further comprising:
variably controlling said small stream of fluid to directly influence driving said compressor section.

6. The method of claim 5 wherein said variable control is remote from said small stream of fluid and said engine exhaust.

7. The method of claim 6 wherein said variable control includes a control valve.

8. The method of claim 1 wherein said small stream of fluid includes compressed air from one of in situ compressed air and a compressor manifold in fluid communication with said compressor section.

9. The method of claim 1 wherein said steering said engine exhaust includes configuring said small stream of fluid to redirect said engine exhaust with respect to said expander section thus changing a resulting driving force from said compressor section.

10. The method of claim 1 wherein effective flow of said engine exhaust in said second direction is controlled by effectively varying one of position and velocity thereof with said small stream of fluid without moving any parts disposed in said engine exhaust.

11. The method of claim 1 wherein the expander section and compressor section include a rotatable shaft therebetween, an expander connected to the shaft and connectable to an exhaust outlet of the engine, a compressor connected to the shaft and connectable to an air intake of the engine for increasing the air pressure to the engine.

12. A power plant system for turbocharging an engine, said system comprising:
a turbocharger for increasing air pressure above ambient air pressure to the engine; and
a control system configured for producing a small stream of fluid operably configured to steer engine exhaust that is directed in a first direction toward an expander section of the turbocharger in a second direction that varies the ability of said engine exhaust to drive a compressor section of the turbocharger,
wherein said small stream of fluid is in fluid communication with said engine exhaust in said expander section, and is configured to provide fluidic control of a larger stream of said engine exhaust, thereby fluidically redirecting a portion of said engine exhaust from said first direction to said second direction.

13. The power plant system of claim 12 wherein said small stream of fluid includes a jet of compressed air in fluid communication with said engine exhaust.

14. The power plant system of claim 12 wherein said small stream of fluid is disposed in a bypass chamber in fluid communication with a turbo inlet, said turbo inlet directing said engine exhaust in said first direction toward said expander section.

15. The power plant system of claim 14 wherein as said stream of fluid increases in one of pressure and velocity, a larger portion of engine exhaust is directed away from said expander section via said bypass chamber.

16. The power plant system of claim 1, wherein the control system further comprises:
a controller configured to variably control said small stream of fluid to directly influence driving said compressor section.

17. The power plant system of claim 16 wherein said controller is remote from said small stream of fluid and said engine exhaust.

18. The power plant system of claim 17 wherein said controller includes a control valve.

19. The power plant system of claim 12 wherein said small stream of fluid includes compressed air from one of in situ compressed air and a compressor manifold in fluid communication with said compressor section.

20. The power plant system of claim 12 wherein said steering said engine exhaust includes configuring said small stream of fluid to redirect said engine exhaust with respect to said expander section thus changing a resulting driving force from said compressor section.

21. The power plant system of claim 12 wherein effective flow of said engine exhaust in said second direction is controlled by effectively varying one of position and velocity thereof with said small stream of fluid without moving any parts disposed in said engine exhaust.

22. The power plant system of claim 12 wherein the expander section and compressor section include a rotatable shaft therebetween, an expander connected to the shaft and connectable to an exhaust outlet of the engine, a compressor connected to the shaft and connectable to an air intake of the engine for increasing the air pressure to the engine.

* * * * *